July 26, 1960

J. B. JONES ET AL

2,946,120

SEAM VIBRATORY WELDING APPARATUS AND METHOD

Filed May 4, 1959

INVENTORS
JAMES BYRON JONES
WILLIAM C. ELMORE
CARMINE F. DE PRISCO

BY Arthur H. Seidel

ATTORNEY

July 26, 1960 J. B. JONES ET AL 2,946,120
SEAM VIBRATORY WELDING APPARATUS AND METHOD
Filed May 4, 1959 6 Sheets-Sheet 4

Fig. 5

INVENTORS
JAMES BYRON JONES
WILLIAM C. ELMORE
CARMINE F. DE PRISCO
BY
Arthur H. Seidel
ATTORNEY July 26, 1960    J. B. JONES ET AL    2,946,120
SEAM VIBRATORY WELDING APPARATUS AND METHOD
Filed May 4, 1959    6 Sheets-Sheet 5

INVENTORS
JAMES BYRON JONES
WILLIAM C. ELMORE
CARMINE F. DE PRISCO
BY
Arthur H. Seidel
ATTORNEY

United States Patent Office 2,946,120
Patented July 26, 1960

2,946,120

SEAM VIBRATORY WELDING APPARATUS AND METHOD

James Byron Jones, West Chester, William C. Elmore, Media, and Carmine F. De Prisco, Glen Mills, Pa., assignors to Aeroprojects Incorporated, West Chester, Pa., a corporation of Pennsylvania Filed May 4, 1959, Ser. No. 810,611

53 Claims. (Cl. 29—470)

The present invention relates to a seam vibratory welding apparatus and method, and more particularly to vibratory welders and methods in which the vibratory energy is applied continuously to the metals so as to be directed to a continuously new work area in the metals.

This application is a continuation-in-part of our previously filed applications Serial No. 579,779 filed April 23, 1956, entitled "Vibratory Seam Welder and Vibratory Seam Welding Process," and Serial No. 579,780 filed April 23, 1956, now abandoned, entitled "Method and Apparatus Employing Vibratory Energy for Bonding Metals," respectively.

In our earlier applications, Serial No. 467,382, filed November 8, 1954, for "Method and Apparatus Employing Vibratory Energy for Bonding Materials," now abandoned; Serial No. 579,780; Serial No. 579,779, we have disclosed a method of welding metals together in which contacting surfaces of the metals to be welded are held under sufficient force to hold them together in firm contact at the intended weld interface and while the metals are so retained vibratory energy comprising a vibratory component substantially parallel to the interface being welded is applied to the metals undergoing welding to weld the metals together. A variety of apparatus embodiments is disclosed in the aforesaid patent applications, including embodiments in which the jaw member engaged with the metals undergoing welding is vibrated while supported by a support mount, which form of mount is described in copending application Serial No. 679,041, filed August 19, 1957, in the name of William C. Elmore and entitled "Support for Vibratory Devices," the disclosure of which is incorporated herein.

Vibratory welding systems basically comprise a device for generating power (usually electrical power), a device for converting the power into elastic vibratory energy, a device for delivering this energy into the weld zone in the prescribed manner in relation to the interface between the contacting workpieces to be welded, and appropriate auxiliary equipment for applying static force to the workpieces so as to hold them together in firm contact at the weld interface area and for controlling the time of application of the vibratory energy in spot-type welding or controlling the rate of continuous-seam welding while the vibratory energy is applied continuously to a progressively new work area.

While continuous-seam vibratory welds may be produced by means of a vibratory spotwelder which is in sliding contact with the workpieces to be welded, as by sliding the welding tip over the stationary metal workpieces or by sliding the workpieces assembly under the stationary welding tip, such sliding contact is generally less desirable for producing continuous-seam-type vibratory welds, as tending to scuff the metal or tear holes in it (especially in thin workpieces), and as tending to render more difficult the control of static clamping forces and thereby increasing the possibility of seam welds of uneven quality along the length of the seam (and perhaps even discontinuous seams because of the presence of intermittent unwelded spots).

This invention has as an object the provision of a method for forming seam welds between metals, by which is meant elemental metals, metal alloys, and other metallic materials such as similar aluminum powder, and including seam welds between similar or dissimilar metals, through the application of vibratory energy.

This invention has as another object the provision of apparatus for forming seam vibratory welds in metals.

This invention has as a further object the provision of apparatus for forming seam vibratory welds in metals comprising apparatus for advancing a rotating jaw member in contact with stationary contacting metal workpieces which are supported on a stationary support.

This invention has as a still further object the provision of apparatus for forming seam vibratory welds in metals comprising apparatus for advancing contacting metal workpieces while contacting said workpieces with a rotating jaw member.

This invention has as still another object the provision of apparatus for forming seam vibratory welds in metals comprising apparatus for advancing contacting metal workpieces between a rotating jaw member and an oppositely rotating support member either one or both of which may be vibrating.

This invention has as a yet further object the provision of apparatus for forming seam vibratory welds between sheet-type metal workpieces.

This invention has as a yet additional object the provision of apparatus for forming seam vibratory welds between sheet-type metal workpieces of relatively small thickness and relatively more massive metal workpieces.

Other objects will appear hereinafter.

For the purpose of illustrating the invention there are shown in the drawings forms which are presently preferred; it being understood, however, that this invention is not limited to the precise arrangements and instrumentalities shown.

Seam welds are desirable in many applications, and seam welds may be in the form, for example, of overlapping spot-type welds or, and preferably, of line-like form having narrow or wide widths, these latter being true continuous seams and generally being more economical of production time. Seam welds provided by the apparatus and process of the present invention possess distinct advantages over seam welds produced by other welding processes such as pressure welding processes and fusion welding processes including resistance welding.

Thus, welds produced by pressure welding greatly deform the cross-section of the weldment and straight seam welds produced by this method greatly deform the metal cross-section along such a distance as to create in effect "a valley between two mountains" and thus generally make for greatly reduced strength of the joined workpiece in the area of the long joint, so much so that it is now common practice to make a zigzag seam pressure weld in order to provide a stronger joint. The process and apparatus of the present invention can produce either straight-line or zigzag seam welds, circles, or other line configurations without excessive deformation in the weld area. While the constant-width type of vibratory seam weld, such as is produced by utilization of continuous-wave-type vibration in connection with the present invention, is generally preferred, odd-shaped (other than constant-width) seams may be accomplished by utilization of other types of vibration such as damped-wave vibration. Moreover, designs may appear on raised portions of the portion of the vibrating element contacting the work for transfer to an outer surface of the work, or two or more spaced line seams may be made at a time by approprriate contouring of the welding tip.

Seam welds produced by fusion welding methods, like spot-type welds produced by these methods, possess cast metallurgical structures, and sometimes form brittle intermetallics which are undesirable in many applications. Furthermore, resistance welding, aside from the cast nugget structure of the weld zone produced, is limited in its application by the electrical resistance of the metals to be welded, subject to shunting effects, and especially in thin metals is apt to produce tiny or very narrow welds and cannot, by its very nature produce the wide or area-type of seam weld possible of production by the process and apparatus of the present invention, which process and apparatus can also produce narrow welds, if desired.

The welding process of the present invention is effected under a clamping force sufficient to hold the metals being welded in firm contact at the intended weld interface. The clamping force may be varied over a very wide range. Thus, in a preferred embodiment of the present invention, the maximum clamping forces need not produce a deformation [1] of more than about ten percent in weldments effected at room or ambient temperatures. In many cases the extent of deformation is appreciably below ten percent and in some instances may be virtually absent altogether. The minimal clamping force to be used in the process of our invention constitutes a force sufficient to maintain the metals being welded in operative disposition, e.g., contacting each other, so that the weld may be effected by the application of vibratory energy.

The range of operative clamping forces which may be employed in the process of the present invention may be readily ascertained by the user of the process. In all cases the clamping force must be sufficient to effect coupling between the metals being welded and the source of vibratory energy which contacts them, so that such vibratory energy may be transmitted to the metals, and particularly to the interface between the metals at the intended weld zone.

Welding in accordance with the process of our invention may be and preferably in many instances is accomplished without the application of heat.[2] If desired, welding in accordance with the process of our invention may also be accomplished at elevated temperatures below the fusion temperature (melting point or solidus temperature of any of the pieces being welded).[3] Thus, heating the metals to be welded prior to, and/or during, welding to a temperature below either of their melting points may, in some cases, facilitate the ease of welding and lower the power-time requirements requisite to achieving welding.

The welding process of our invention may be applied to a wide variety of metals, examples of which include: aluminum to aluminum; aluminum alloy to aluminum alloy; copper to copper; aluminum alloy to steel; steel to steel; etc.

Moreover, the welding process of our invention may be applied to metals of a wide range of thicknesses, such as to the welding together of very thin foils up to the welding of sheet metals having a thickness of up to about 0.100-inch and more to other metals having the same or appreciably greater thicknesses.

The welding of most metals can be effected in accordance with the process of our invention in the ambient atmosphere. However, the process of our invention comprehends welding under near-vacuum conditions or in selected atmospheres such as atmospheres comprising an inert gas.

Furthermore, while the welding process of our invention may be effected with metals, such as aluminum, without the extensive pre-cleaning required to effect satisfactory welding by other methods, a degree of precleaning and surface treatment prior to welding may prove advantageous in the welding of many metals, particularly where reproducibility of welding results is desired. It is desirable prior to effecting welding in accordance with the present invention to remove all surface contaminants, such as hydrocarbon lubricants, mill scale, and the like.

While the range of 59 to 300,000 cycles per second is operative for vibratory welding, and therefore for the roller seam welding apparatus and method of the present invention, use of a resonant disk tip, such as will be described below, may make operation within the range of 3,000 to 100,000 cycles per second, and preferably 10,000 to 90,000 cycles per second, desirable, which is also a practical construction size range for the remainder of the vibratory equipment such as the transducer-coupler. Of course, operation below about 15,000 cycles per second may be objectionable to the ear, as being in the audible range.

Welding is accomplished within a wide time range, such as a time range for spotwelding of between about 0.001 second to about 6.0 seconds, with welding under most normal conditions being effected during a time interval of from several hundredths of a second to several seconds. The time during which a small unit area of weld interface is exposed during roller seam welding would appear to be relatable to single spotweld time pulses; however, in roller-type seam welding, the situation is somewhat complex, involving preheating of the weld area by weld accomplishment of the differential weld area precedingly completed. The surface speed of the surface of the roller which delivers the vibratory energy, of course, delineates the welding rate in inches per minute, if there is sufficient power available.

It is known that vibratory equipment, such as equipment of the ultrasonic power delivery type, may accept varying amounts of input power at a given frequency (for example, a typical magnetostrictive transducer comprising a stack of nickel laminations 2¼ inches square having a design frequency of 15,000 cycles per second, with the nickel laminations having a thickness of 0.010-inch will accept up to about 1800 R.F. watts corrected for power factor). The power range of a given machine depends

---

[1] By deformation is meant the loss in thickness of the weldment at the center of the weld zone divided by the aggregate thickness of the sheets prior to welding; result multiplied by 100 to obtain percentage.
[2] The weldment may be warm to the touch after the formation of the weld due to the application of vibratory energy.
[3] The temperatures to which the foregoing statements refer are those which can be measured by burying diminutive thermocouples in the weld zone prior to welding.

principally upon the manner and materials of construction and once the machine has been built the operator is limited in choice of power to the capacity of the machine. Within the capability ranges of a given unit of equipment, which are dependent upon the size of such equipment and its particular design, the power applied during the vibratory welding of a particular metal or combination of metals is not critical, and in many instances the machines are operated at maximum power. For one machine, the controllable factors of power, time, and clamping load come into question principally when a particular quality of weld is desired as contrasted to simply the production of a metallurgical bond. Power and time are somewhat interrelated; within limits, less power can be compensated for by more time, and more power can often lessen the requisite welding time.

Figures 1, 2, 10:
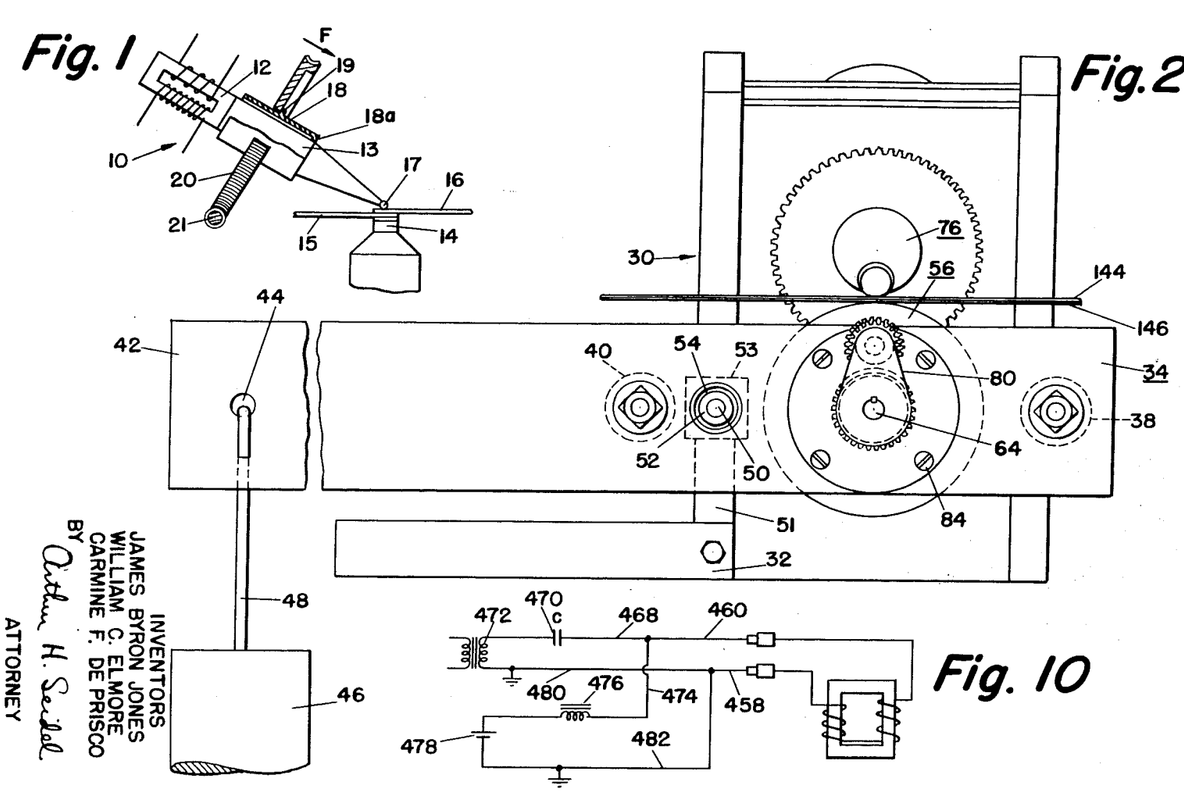
Figure 1 is an elevational view of one embodiment of the seam vibratory welding apparatus of the present invention.
Figure 2 is a front elevational view of another embodiment of the seam welding apparatus of the present invention.
Figure 10 is a diagrammatic illustration of a typical vibratory power circuit for the welding apparatus of Figure 6.

Referring to the drawings, a basic embodiment of the roller-type continuous-seam welding apparatus of the present invention is shown in Figure 1 and is designated generally as 10.

The apparatus 10 comprises the transducer-coupler 12—13 comprising transducer 12 consisting of an appropriately energized and polarized nickel stack, and coupler 13 consisting of a solid cylindrical metal section and a tapered section with the end of the solid section remote from the tapered section being joined to the transducer by metallurgical means such as by brazing or welding, said transducer-coupler being angularly retained in respect to anvil 14. The workpieces 15 and 16 are maintained in the space between anvil 14 and the end 17 of coupler 13. Coupler 13 is preferably for best results although not necessarily, supported by the mount collar 18, comprising a collar of one-half wavelength in the metal at the operating frequency fixedly secured at end 18a to coupler 13. The collar 18 is anchored by means of a centrally positioned lip or flange 19, which is supported on member 20 which may be pivoted about pivot 21.

We have found that vibratory welding may be accomplished with the array shown in Figure 1 notwithstanding the bending stress put on the mount 18 and coupler 13 by the downward urging of the end 17 against the workpieces 15 and 16 by the force designated F about the pivot 21.

It will be apparent that the apparatus 10 may be operated as, for example, a hand-held device (by dispensing with the pivot and modifying the member 20 to be a handle) or an automated welder so as to roll or slide the tip 17 of the transducer-coupler 12—13 over the surface of the workpiece 16 in any direction so as to form a continuous line which is straight, curved, or any other shape.

Anvil member 14 should preferably be non-compliant acoustically to transducer-coupler 12—13 and may comprise a heavy metal mass, a plate, a block or the like. When the anvil member 14 assumes the form of a heavy mass, plate, or block, it need have no particular dimensions. When in the form of a smaller member, it may be desirable in some instances to regulate the dimensions of the anvil member so that it is de-tuned in bending vibration at the applied frequency in respect to its support, e.g., to be non-compliant with the applied vibratory frequency of the transducer-coupling system, and thus reflect much of the elastic vibratory energy introduced to the elements 15 and 16 undergoing welding. Alternatively, for the anvil member 14 may be substituted a second transducer-coupler system activated vibratorily in opposition to the first transducer-coupler system, in order to be non-responsive acoustically thereto.

In the illustrated embodiment, the longitudinal axis of the transducer-coupler 12—13 is angularly positioned in respect to the tangent plane of the workpieces and of the opposed surface of the anvil member 14. However, it is desirable to restrict the angularity of the transducer-coupler in respect to the workpieces and anvil. Thus, it is the vibratory component in a plane parallel to the plane of the interface between the materials undergoing welding which is presently deemed primarily responsible for vibratory welding, and while this may be accomplished at any angle to the horizontal (assuming the uppermost surface portion of anvil 14 to be horizontal and the workpieces to be flat) by appropriate design of the sonotrode, it is more readily achieved at relatively small angles to the horizontal, with the range of angles being preferably between zero degrees and sixty degrees, and it is most desirable to have the axes of the transducer-coupler and the face of the anvil parallel.

Figure 3:
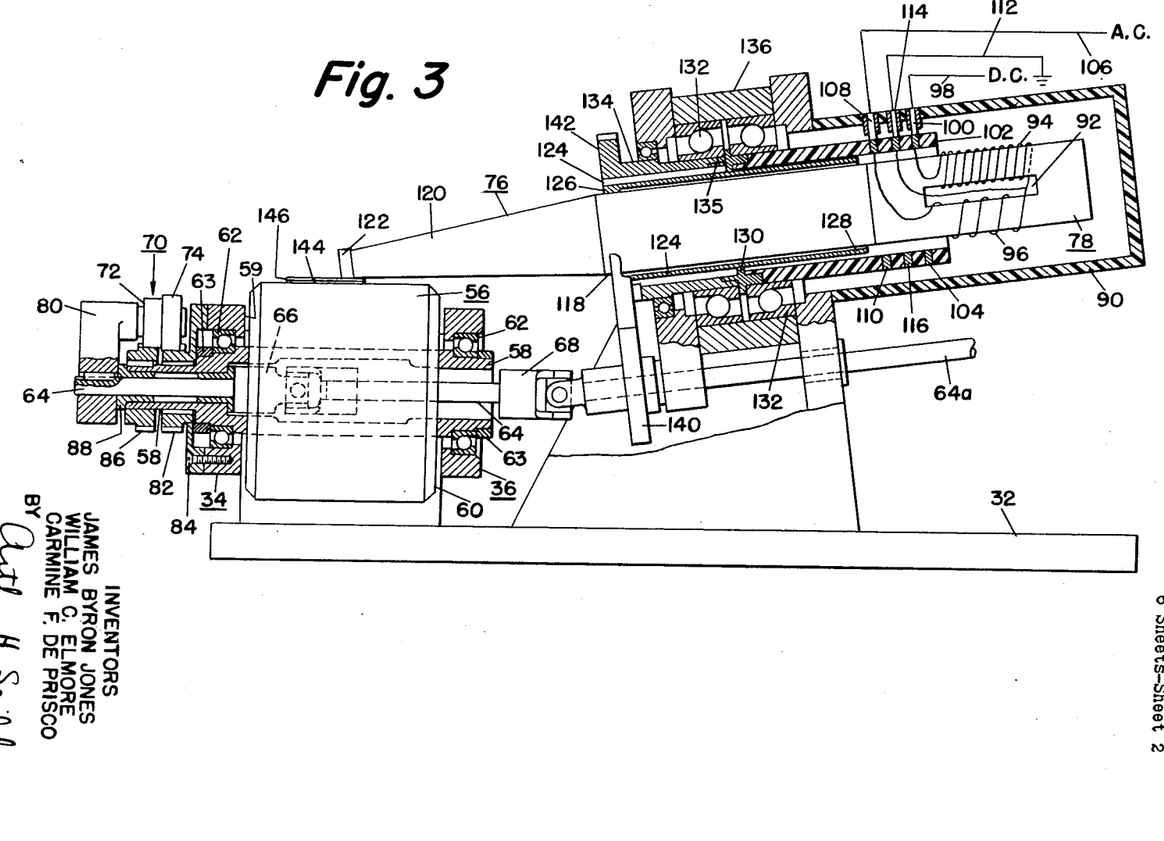
Figure 3 is a longitudinal sectional view through the apparatus shown in Figure 2 passing through the plane of the axis of the welder's shaft and sonotrode.

Referring to Figures 2 and 3, there is shown therein an automated welding apparatus.

The seam welder shown therein is designated by the numeral 30 and comprises a base 32 on which is mounted a pair of pivot arms 34 and 36, which are retained in parallel spaced juxtaposed relationship by means of spacers 38 and 40. The end portion 42 of each of pivot arms 34 and 36 remote from spacer 40 is provided with an aligned juxtaposed aperture 44. A weight 46 of selected mass may be suspended from the apertures 44 by means of cable 48.

The pivotation of pivot arms 34 and 36 is about pivot 50. Pivot 50, which is carried upon upright 51, comprises a trunnion 52 supported in rotary bearings 54 in each of pivot arms 34 and 36. The center portion 53 of trunnion 52, which in the illustrated embodiment is of rectangular cross-section, has an axial length less than the axial length of spacers 38 and 40 so as not to frictionally interfere with the pivotation of pivot arms 34 and 36 about trunnion 52.

A roller 56 comprising a bored cylindrical member is carried on shaft 58 between pivot arms 34 and 36, the axial length of roller 56 being less than the spacing between the pivot arms 34 and 36 so that friction between the end faces 60 of roller 56 and the juxtaposed faces 59 of the pivot arms 34 and 36 is avoided.

Roller 56 is carried on shaft 58, which is supported in bearings 62 in pivot arms 34 and 36. The axial displacement of shaft 58 in reference to bearings 62 is prevented by collars 63. The drive shaft for roller 56 includes a flexible coupling 66 (which is unnecessary when the axes of roller 56 and transducer-coupler members 76, 78 are parallel). Flexible coupling 66 may be positioned within shaft 58. The drive shaft 64 may include a flexible coupling 68, whose function will be made more clear herein-below.

Shaft 58 is rotated by means of an epicyclic gear train designated generally by the numeral 70 which comprises gears 72 and 74, which are rigidly connected together and carried on arm 80, which is splined to drive shaft 64 and rotates therewith. Epicyclic gear 74 is meshed with gear 82 which is fixedly and non-rotatably secured by threaded bolts 84 to the outer face of pivot arm 34. Gear 74 is rotated upon the rotation of shaft 64 and arm 80 upon its engagement with fixed gear 82, whereupon gear 72 is also rotated. The rotation of gear 72 effects the rotation of gear 86 which is splined to shaft 58. A pair of bushings designated by the numeral 88 support drive shaft 64 within the portion of shaft 58 proximate arm 80.

The sonotrode 76 and transducer 78 are supported within housing 90. The transducer 78 comprises a laminated core of nickel, nickel-iron alloy, Permendur (an iron-cobalt alloy), or an aluminum-iron alloy, or other magnetostrictive material, properly dimensioned to insure axial resonance with the frequency of the alternating current applied thereto so as to cause it to change in length according to its coefficient of magnetostriction. Transducer 78 includes a rectangularly-shaped opening 92 at its central portion. The elements of a polarizing coil 94 and an excitation coil 96 may be wound through the opening 92 within transducer 78. The desirability of magnetically polarizing transducer 78 by means of polarizing coil 94 in order for the metal laminations in transducer 78 to efficiently convert the applied R.F. energy from excitation coil 96 into elastic vibratory energy will be readily understood by one skilled in the art.

Direct current for polarizing coil 94 is furnished through line 98 and brush 100 which contacts slip ring 104 on concentric tube 102. Alternating current for excitation coil 96 is furnished through line 106, brush 108 and slip ring 110. The return for both the direct current and the alternating current is through line 112, brush 114 and slip ring 116. Slip rings 104, 110 and 116 are insulated from each other and connection between the slip rings on shaft 102 is thereby prevented. Similarly, the brushes 100, 108 and 114 are insulated from each other, and connection between the brushes on housing 90 is thereby prevented.

In place of transducer 78, other forms of transducing means for producing elastic vibratory energy may be used, such as a transducer stack of laminated strips of metal associated with a permanent magnet and a source of applied R.F. energy, or piezoelectric, electrostrictive, or other types of transducers.

The sonotrode 76 or coupling member or jaw member comprises a cylindrical rod portion 118 metal-to-metal bonded in end-to-end contact with transducer 78; a tapered portion 120 whose taper may, but need not necessarily, satisfy the equation set forth at page 163 of Piezoelectric Crystals and Their Application to Ultrasonics, by Warren P. Mason, published in 1950 by Van Nostrand Company, namely a curved coupling member whose taper is an exponential function of the length and satisfies the relation:

$$S = S_0 e^{-2Tl}$$

where S equals the original area, $S_0$ equals the reduced area, T equals the taper constant, and $l$ equals the length of the tapered section, and a tip 122 which may comprise an enlarged bulb having a curved periphery. The total length of the sonotrode 76 should be an integral number of half wavelengths of the transducer's frequency so that the joint between the transducer 78 and the sonotrode 76 will come at a loop of the wave motion and will not be seriously stressed.

The sonotrode 76 and transducer 78 are supported by means of a support mount, which, as heretofore noted, is described in copending United States Patent Application Serial No. 679,041, filed August 19, 1957, in the name of William C. Elmore, entitled "Support for Vibratory Devices." The support mount comprises a cylindrical metal shell such as the cylindrical steel shell 124, or a resonant-in-length shell of other suitable material, said shell having a length of at least a single one-half wavelength according to the metal used at the applied frequency. Shell 124 may have a length equal to a multiple number of one-half wavelengths. In the illustrated embodiment shell 124 has a length equal to one-half wavelength. Cylindrical shell 124 surrounds the cylindrical rod portion 118 of sonotrode 76 and is concentric therewith and joined thereto at its lowermost end 126 by appropriate means, as by welding, brazing, or soldering. The uppermost end 128 of shell 124 is free from any attachment and, accordingly, when the system is vibrating, a true node will develop in the cylindrical shell at the region of the attachment means 130 which is positioned equidistant (where the shell has a length, as does the subject shell of one-half wavelength) from ends 126 and 128, or namely one-quarter wavelength distant from free end 128 of cylindrical shell 124.

The attachment means 130 comprises a radially extending flange or lip fixedly secured intermediate a pair of bearings 132 and fixedly engaged with tubular shaft 134 by brazing or the like. As will be evident from an examination of Figure 3 the end 135 of the shaft 134 which is joined to attachment means 130 is rabbeted in order to provide a larger surface for brazing, and to insure positive securement of shaft 134 to attachment means 130. Bearings 132 are carried within tubular housing portion 136 of housing 90.

The rotation of the sonotrode 76 and transducer 78 is effected by means of the portion 64a of drive shaft 64 (which portion 64a may be angularly positioned by means of flexible couplings 66 and 68 to the portion disposed within shaft 58). A spur gear 140 is mounted on portion 64a of shaft 64 proximate flexible coupling 68 and meshes with spur gear 142 which is fixedly secured to the forwardmost end of tubular shaft 134. Thus, rotation of drive shaft 64 and spur gear 140 causes sonotrode-transducer 76 and 78 to rotate.

The gearing is constructed and arranged so that the surface speeds of both the tip 122 and the roller 56 are equal, the use of epicyclic gear train 70 permitting the appropriate relative differential in angular velocity necessitated by the great difference in diameters of the geometry here presented.

The clamping pressure on the workpieces 144 and 146 comprising the strips of foil or sheet metal which are undergoing welding is regulated by varying the weight 46 suspended from apertures 44. Since pivot 50 constitutes the fulcrum for the lever pivot arms 34 and 36, with the two arm portions of each of said levers being defined by the portion thereof between aperture 44 and pivot 50, and pivot 50 and the center of shaft 58, the mechanical advantage is the relative ratio between the aforesaid arms (the arms on each of the pivot arms 34 and 36 being of identical length). Thus, if the distance between the apertures 44 and pivot 50 is four times greater than the distance between pivot 50 and the center of shaft 58, there will be a mechanical advantage of four for the weight 46 as applied to the workpieces 144 and 146. The flexible couplings 66 and 68 permit tilting of both the pivot arms 34 and 36 relative to the sonotrode-transducer 76, 78. The connection of shaft 64 and coupling 68 may conveniently be splined or otherwise arranged to permit axial sliding, as is usual in the application of universal joints.

In the illustrated embodiment the longitudinal axis of sonotrode-tranducer 76, 78 is angularly positioned in respect to the tangent plane of the opposed surface of roller 56 at an angle of about 15 degrees. This angle was arbitrarily selected because it is sufficiently large to permit clamping pressures to be applied to the workpieces and welding to be performed. It is desirable to restrict the angularity of the sonotrode-transducer in respect to the workpieces. Thus, it is the vibratory component in a plane parallel to the plane of the interface between the materials undergoing welding which is presently deemed effective for vibratory welding, and while this may be accomplished at any angle to the horizontal (assuming the uppermost surface portion of roller 56 to be horizontal, and the workpieces to be flat) by appropriate design of the sonotrode, it is more readily achieved at relatively small angles to the horizontal, with the range of angles being preferably between zero degrees and 30 degrees. The angle should, in the illustrated embodiment, be sufficiently large to permit workpieces to be contacted only in the weld area and not, for example, in the throat zone between the tip 122, the end of the cylindrical portion 118, and the rearmost edge of the cylinder 56. Nevertheless, while the illustrated embodiment reveals a configuration in which an angle of inclination between the roller 56 and sonotrode 76 is present, it is preferable where the necessity of an unrestricted throat zone is not present to have the axes of sonotrode 76 and roller 56 parallel.

Throat clearance, even when the axes of sonotrode 76 and roller 56 are parallel, may especially be obtained through the use of a resonant-disk tip such as that disclosed in copending patent application Serial No. 747,254, filed July 8, 1958, in the names of William C. Elmore and Carmine F. De Prisco, entitiled "Vibratory Device," the disclosure of which is incorporrated herein by reference. Additional advantages for seam-welding purposes may be provided by the use of such a tip, including those cited in the said copending application.

The operation of the welding apparatus of the present invention is as follows:

The workpieces 144 and 146, which may comprise metallic sheets, or foils, or a sheet and a foil (the metals may be the same or different metallic elements, metal alloys and the like and may be the same thickness or dissimilar thicknesses and may be composed of layers of dissimilar metals or alloys) are positioned between tip 122 and roller 56. The applied static compressive force on the weld zone is regulated by varying the weight 46 on cable 48 providing a moment about pivot 50 which is resisted by the workpieces 144 and 146 through tip 122 and back through the structure of the system. While as noted in copending patent application Serial No. 579,780, a wide variety of clamping pressures may be used to effect vibratory welding, the optimum clamping pressures vary depending upon the nature of the metals undergoing welding and their thickness, and may be readily determined by a series of test welds.

The rotational speed of drive shaft 64 may be varied dependent upon the optimum welding time requirements to obtain seam welding of the metals undergoing welding.

As heretofore noted, a wide operating frequency can be tolerated, it being possible to effect welding within the range 59 to 300,000 cycles per second, with the range 4,000 to 90,000 cycles per second being preferred. While the subject apparatus has been illustrated with magnetostrictive transducer means for generating the vibratory energy, it is, of course, to be understood that other types of transducers made of other materials (such as piezoelectric materials such as quartz crystals, electrostrictive materials such as ceramics like barium titanate, lead titanate-lead zirconate compositions, etc., ferrites, etc.), may be substituted.

Means may be provided for conveying the workpieces as a web between the tip 122 and roller 56 so that optimum automation may be achieved.

In a preferred embodiment of the present invention the materials undergoing welding are advanced continuously at a rate such that continuous seam welding is effected. However, if desired, cam means or other controller means may be provided on the drive shaft for advancing the materials undergoing welding a predetermined distance, stopping the drive shaft long enough to permit welding and then resuming the rotation of the drive shaft, or the ultrasonic energy can be intermittently turned on and off as the work pieces progress between tip 122 and roller 56, achieving a series of spaced spot or interrupted seam welds.

While a cylindrical rotating support has been illustrated in the subject embodiment, supports having other shapes, such as a support in the shape of a truncated cone may be substituted therefor. Alternatively, the support itself may constitute a vibratorily activated member, and may duplicate or closely resemble the sonotrode 76.

Figure 4:
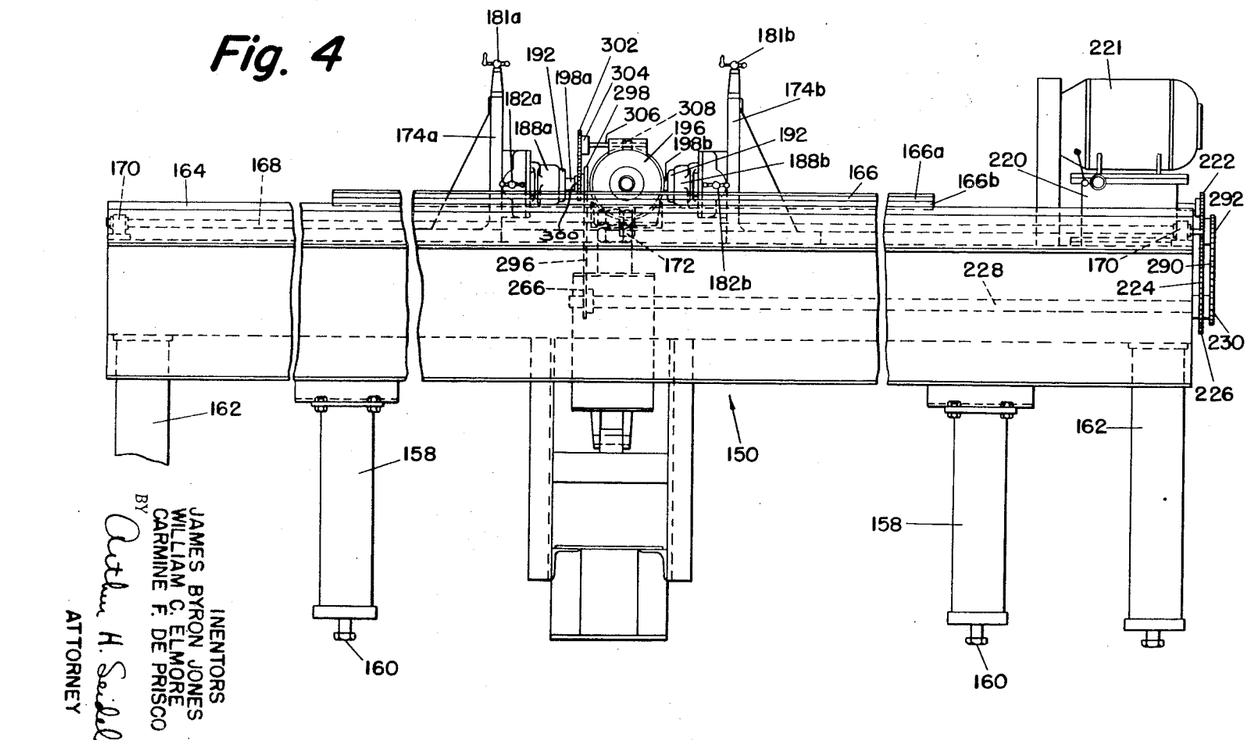
Figure 4 is a front elevational view of another embodiment of the seam welding apparatus of the present invention, with parts being broken away for the sake of clarity.
Figure 5:
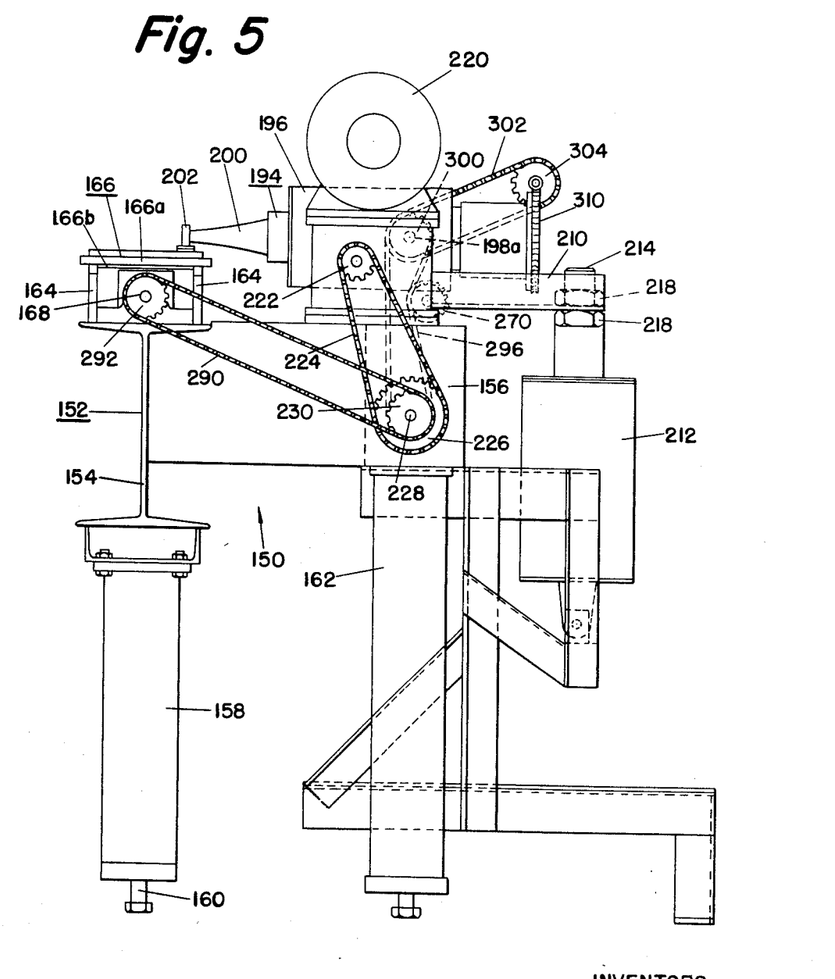
Figure 5 is an end elevational view of the embodiment of the seam welding apparatus shown in Figure 4.

Figures 4 and 5 show an embodiment of the seam welder of the present invention wherein the transducer-coupler assembly is ball-bearing and slip-ring mounted, the slip rings providing power delivery during rotation to the transducer from the electronic generator, and wherein the entire welding head is rotated by means of a series of chains and sprockets which permit control over angular velocity and table translation, and wherein the reflector anvil is a traversing bed which moves at a surface speed which matches the surface speed of the welding tip. The parts to be welded are clamped between the welding tip and the traversing bed, static load is applied through a compressed air cylinder, and vibratory energy is introduced while the workpieces are translated between the rolling tip and the translating table. Thus, Figures 4 and 5 show another embodiment of the seam welder of the present invention, generally designated as 150.

Seam welder 150 comprises a mounting base, generally designated as 152. Base 152 comprises an elongated horizontal I-beam 154, and a horizontal box-beam 156 which is U-shaped in plan view and has its principal horizontal portion parallel to and, in the present embodiment, extending the full length of the I-beam 154 with the arms of the U being connected to the back of I-beam 154 so that the box-beam 156 is essentially parallel to the I-beam 154. I-beam 154 is supported adjacent its ends on posts 158. Each of the posts 158 has a headed rod 160 threaded into the bottom end of the post 158 to permit leveling of the base 152. The back end of the box-beam 156 is supported on posts 162.

A pair of spaced, parallel tracks 164 are mounted on the top of the I-beam 154. Tracks 164 extend along the entire length of the I-beam 154. A T-shaped table 166 is slidably mounted on the tracks 164. The top 166a of the table 166 extends across and is slidably seated on the tracks 164. The leg 166b of the table 166 extends between the tracks 164, and engages the sides of the tracks 164 so that the table 166 can slide only longitudinally along the tracks 164. A worm shaft 168 is mounted between and parallel to the tracks 164 and beneath the table 166. The ends of the worm shaft 168 are rotatably supported in bearings 170 which are mounted on the top of the I-beam 154. A split nut 172 is secured to the bottom of the leg 166b of the table 166, and meshes with the worm shaft 168. Thus, rotation of the worm shaft 168 will slide the table 166 longitudinally along the tracks 164.

A pair of adjustable way slides 174a and 174b support the welding head 194 and are mounted above the box-beam 156 of the base 152. The way slides 174a and 174b are secured to the top of the box-beam 156. The welding head 194 is supported in bearing blocks 188a and 188b, which are attached to the way slides 174a and 174b, in such a way that simultaneous adjustment of the handles of the way slides will result in a horizontal or vertical motion of the welding head 194 as desired; i.e., adjustment of handles 181a and 181b provides vertical adjustment, whereas adjustment of handles 182a and 182b provides horizontal adjustment.

Welding head 194 comprises a welding head casing 196 having a pair of trunnions 198a and 198b extending from opposite sides of the welding head casing 196. Trunnions 198a and 198b are rotatably supported in the bearings 192 of the bearing blocks 188a and 188b. The sonotrode 200 and its transducer, not shown, are rotatably supported in the welding head casing 196. The sonotrode 200 projects from the front end of the welding head casing 196, and extends over the table 166. The sonotrode 200 has a welding tip 202 secured to its forwardmost end which is over the table 166.

An arm 210 is secured at its forward end to the bottom of the welding casing 196, and extends rearwardly from the welding head casing 196. An air cylinder 212 is mounted in an upright position on the back end of the box-beam 156 of the base 152. Air cylinder 212 contains a piston, not shown, and a piston rod 214, which is connected to the piston and projects vertically upwardly from the top end of the air cylinder 212. Piston rod 214 is secured to the rearward end of the arm 210 by loose nuts 218, which allow for angular motion.

The source of power for traversing the table 166 along the tracks 164, and for rotating the sonotrode 200 is a variable-speed hydraulic power unit 220 which is driven by an electric motor 221. This assembly is mounted on one end of box-beam 156. The output shaft of power unit 220 drives a sprocket wheel 222.

Sprocket wheel 222 is connected by an endless chain 224 to sprocket wheel 226, which is mounted on the end of shaft 228. Shaft 228 is rotatably supported in box-beam 156 by bearings which are not shown. Sprocket wheel 230, mounted on shaft 228, is connected by an endless chain 290 to a sprocket wheel 292 which is mounted on the end of the worm shaft 168. Thus the worm shaft 168 is driven from the power unit 220 to traverse the table 166 along the tracks 164.

Sprocket wheel 266, mounted on shaft 228, is connected by an endless chain 296 to a sprocket wheel 298 which is rotatably supported on trunnion 198a. Sprocket wheel 270 is adjustably mounted so that tension of chain 296 may be regulated as the welding head is raised or lowered. Sprocket wheel 300, rigidly coupled to sprocket wheel 298, is connected by an endless chain 302 to sprocket wheel 304. Sprocket wheel 304 is mounted on shaft 306, which is rotatably supported on welding head casing 196. Worm 308 is mounted on shaft 306 so that rotation of shaft 306 causes a rotation of worm gear 310 which is secured to sonotrode 200. Thus the sonotrode 200 is connected to the power unit 220 so that the sonotrode 200 is rotated at the same time that the table 166 is traversed along the tracks 164. The sprocket and gear ratios are chosen so that the surface speed of the welding tip 202 is equal to the translating speed of the table 166.

The operation of the seam welder 150 to weld together two metal workpieces is as follows:

The metal workpieces are placed in overlapping contacting relation on the table 166 and beneath the welding tip 202. The distance between the circumference of the welding tip 202 and the work table 166 can be adjusted to receive the particular workpieces by adjustment of the way slides 174a and 174b by means of the handles 181a, 181b, 182a, 182b as hereinbefore described.

Air under pressure is then admitted to the air cylinder 212 below the piston within the cylinder 212. This pushes the rear end of the arm 210 upwardly so as to pivot the welding head 194 about the trunnions 198, and thereby force the welding tip 202 against the metal workpieces. The pressure of the air admitted into the air cylinder 212 is adjusted to apply the desired clamping force between the welding tip 202 and the metal workpieces.

Power unit 220 is then turned on to traverse the table 166 along the tracks 164, and to rotate the sonotrode 200 and its welding tip 202, the hydraulic speed adjustment being manipulated to accomplish a surface speed of the table and the weldment such that welding is effected at the power available. The polarizing current and high-frequency alternating current to the welding head transducer are turned on to provide sufficient continuous vibratory energy to the welding tip 202 to weld the metal workpieces together. As the table 166 is traversed along the tracks 164, the table 166 carries the workpieces, and moves the workpieces with respect to the welding tip 202 at the same speed that the welding tip 202 is rotating. Thus, the workpieces are welded together along a continuous seam which extends the full length of the workpieces.

Figure 6:
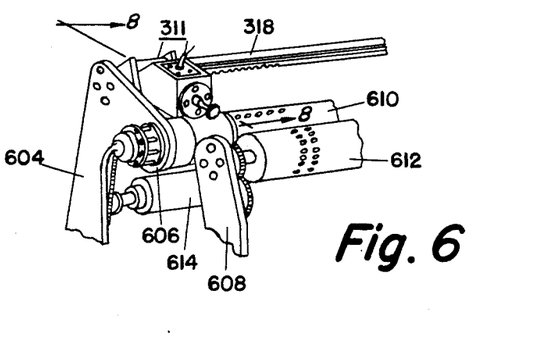
Figure 6 is a perspective view of a portion of another type of welding apparatus of the present invention.

Figure 6 shows a portion of the splicing apparatus described in copending United States patent application Serial No. 801,889, entitled: "Positioning and Splicing Apparatus for Positioning and Splicing Webs," filed March 25, 1959, in the name of James Byron Jones, the disclosure of which is incorporated herein by reference.

In general, the splicing apparatus comprises a spaced pair of upright, rear mounting arms 604 (only one of which is shown) each of which has a forwardly extending arm 606, and a spaced pair of upright front mounting arms 608 (only one of which is shown). An anvil-tension roll 610 is rotatably mounted between the arms 606 of rear mounting arm 604, and a tension roll 612 is rotatably mounted between front mounting arms 608. An idler roll 614 is rotatably mounted between rear mounting arms 604 below and behind anvil-tension roll 610. Supporting and guide shaft 318 and screw shaft 332 are mounted between rear mounting arms 604 rearwardly of anvil-tension roll 610. Supporting mount 312 of welder 311 is mounted on shafts 318 and 332 with the welding head 314 extending forwardly therefrom so that welding tip 398 is over the anvil-tension roll 610. Screw shaft 332 is rotatably mounted on the rear mounting arms 604 and a drive means (not shown) is provided to rotate the screw shaft 332.

Figures 8, 9:
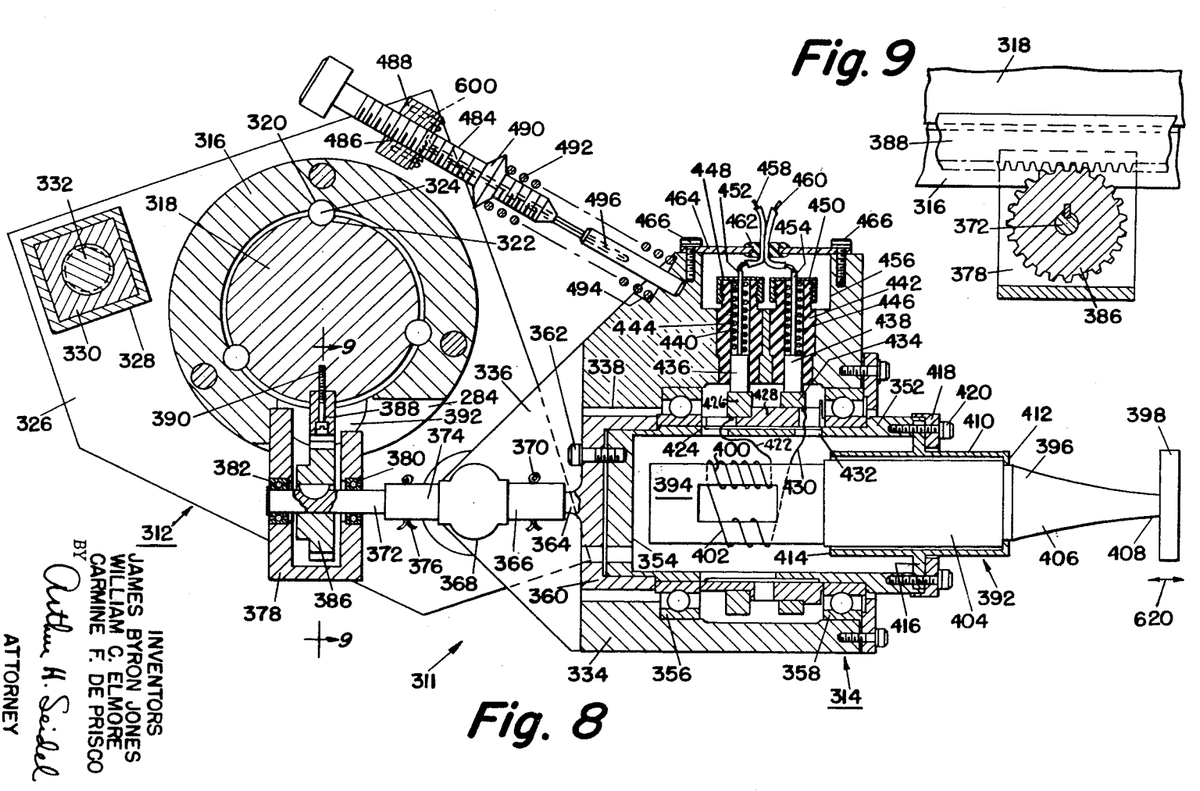
Figure 8 is a sectional view of the welding apparatus of Figure 6 taken along line 8—8 of Figure 6.
Figure 9 is a sectional view taken along line 9—9 of Figure 8.

Referring to Figure 8 of the drawings the vibratory welder 311 comprises a supporting mount, generally designated by the numeral 312, and a welding head, generally designated by the numeral 314.

Supporting mount 312 comprises a tubular sleeve 316 surrounding the elongated supporting and guide shaft 318. Sleeve 316 has three circumferentially-spaced, longitudinally-extending substantially-semicircular grooves 320 in its inner surface which mate with longitudinally-extending, substantially-semicircular grooves 322 in the outer surface of shaft 318. Ball bearings 324 fit in each pair of mating grooves 320 and 322, and support sleeve 316 on shaft 318. Thus, ball bearings 324 permit sleeve 316 to move longitudinally along shaft 318, but prevent relative rotation between the sleeve 316 and shaft 318. A pair of mounting plates 326 are secured to sleeve 316 one at each end of the sleeve 316 (see Figure 7) and the plates 326 extend radially beyond the sleeve 316. A hollow member 328 of substantially square cross-section is secured between mounting plates 326 behind sleeve 316 and contains therein internally threaded nut members 330. The elongated, externally threaded screw shaft 332 is threaded through nut members 330. Screw shaft 332 is mounted in a manner so that it can rotate but will not move longitudinaly, so that rotation of screw shaft 332 causes the supporting mount 312 to traverse along guide shaft 318.

Welding head 314 comprises a substantially rectangular casing 334 having a pair of rearwardly extending arms 336, one along each side of the casing 334, and an enlarged opening 338 extending through the casing 334 from its front face to its rear face. Arms 336 extend between mounting plates 326 with each arm 336 being pivotably mounted on an adjacent mounting plate 326 by a stub shaft 340 at a point below sleeve 316 and forwardly of the center of sleeve 316. The inner end of each of stub shafts 340 fits tightly through a hole 342 in its respective arm 336 and is secured to the arm 336 by a pair of nuts 344 and 346 threaded on the stub shaft 340. The outer end of each of stub shafts 340 extends into a hole 348 in its respective mounting plate 326 and is rotatably supported in the hole 348 by a roller bearing 350.

A hollow barrel 352 of circular cross-section having a closed rear end 354 is rotatably supported in casing opening 338 by a pair of spaced ball bearings 356 and 358. A cup-shaped hub 360 fits around the rear end of barrel 352 and is secured to the closed end 354 of barrel 352 by a cap screw 362. Hub 360 has a shaft 364 extending rearwardly therefrom which shaft 364 is secured in the output shaft 366 of a universal coupling 368 by a cotter pin 370. A shaft 372 is secured in the input shaft 374 of universal coupling 368 by a cotter pin 376. Shaft 372 extends through a gear box 378 and is rotatably supported on the walls of the gear box 378 by a pair of ball bearings 380 and 382. Gear box 378, which is open at its top, fits into an opening 384 in the bottom of sleeve 316, and is secured to the sleeve 316. A gear 386 is mounted on and secured to shaft 372 within gear box 378, and gear 386 meshes with a toothed rack 388 which is secured to the bottom of shaft 318 by screws 390. Sleeve 316 has an enlarged elongated groove 392 in its inner surface which permits rack 388 to pass through the sleeve 316. Thus, when supporting mount 312 is traversed along shaft 318 the rack 388 rotates gear 386 and thereby rotates barrel 352. The center of the universal joint 368 is in direct alignment with the center of stub shafts 340 so that the welding head 314 can be pivoted with respect to the supporting mount 312 without breaking the coupling between shaft 372 and shaft 364.

A vibratory device generally designated as 392 is mounted in barrel 352. Vibratory device 392 comprises a magnetostrictive transducer 394, a coupler 396, and a resonant tip 398.

The magnetostrictive transducer 394 is of conventional construction and comprises a laminated core of nickel, nickel-iron alloy, Permendur (an iron-cobalt alloy), Alfenol (an aluminum-iron alloy), or other magnetostrictive material, properly dimensioned to insure axial resonance with the frequency of the alternating current applied thereto so as to cause it to change in length according to the coefficient of magnetostriction. The detailed construction of a suitable magnetostrictive transducer, which in the illustrated embodiment comprises a nickel stack, is well known to those skilled in this art and does not form a part of the present invention, and accordingly no detailed description of its construction will be made herein.

The magnetostrictive transducer 394 includes the polarizing coil 400 and the excitation coil 402. The desirability of magnetically polarizing the magnetostrictive transducer 394 by means of polarizing coil 400 in order for the metal laminations in the magnetostrictive transducer 394 to efficiently convert the applied RF energy from excitation coil 402 into elastic vibratory energy will be readily understood by one skilled in the art.

It will be appreciated by those skilled in the art, that in place of the magnetostrictive transducer 394 shown in the drawing, other known types of transducers may be substituted. For example, electrostrictive or piezoelectric transducers, made of barium titanate, quartz crystals, lead titanate, lead zirconate, etc., may be utilized.

The magnetostrictive transducer 394 is metallurgically bonded in end-to-end contact as by silver brazing or the like to the coupler 396. The coupler 396 may be any one of the wide variety of couplers known to the art. In the illustrated embodiment the coupler 396 comprises the cylindrical coupling member 404 formed of solid steel and an extension thereof 406 which comprises a tapered coupler portion and an integral cylindrical portion, with the cylindrical portion being integral with or metallurgically bonded or screw-connected in end-to-end contact to the cylindrical coupler member 404. For the delivery of maximum power the tapered coupler portion of the second coupler bar 406 may be curved so as to have a taper that is an exponential function of its length and satisfies the following equation:

$$S = S_0 e^{-2Tl}$$

where $S_0$ is the reduced area at the end 408, S is the area of the cylindrical portion of such second coupler bar 406, T is a constant for the taper, and $l$ is the length of the tapered coupler. This equation is set forth at page 163 of Piezoelectric Crystals and Their Application to Ultrasonics, by Warren P. Mason, published in 1950 by D. Van Nostrand Company, and the design of the tapered portion is discussed therein, including a drawing thereof which Mason designates as a "Metal 'horn' for obtaining a large strain in a metal sample."

The cylindrical portion of the second coupler bar 406 is supported by support mount 410. The support mount 410 comprises a cylindrical metal shell, such as a cylindrical steel shell or a shell of other suitable resonant material. The shell 410 has a length of one-half wavelength according to the metal used at the applied frequency, or a length equal to a unit number of one-half wavelengths. In the illustrated embodiment, the shell 410 has a length equal to a single one-half wavelength. The shell 410 surrounds the cylindrical coupler bar 404, being concentric therewith and spaced therefrom. At the end of the shell 410 which is furthest from the magnetostrictive transducer 394 there is a radially inwardly disposed flange 412 which is metallurgically bonded to the cylindrical portion of the second coupler bar 406. The end 414 of support mount 410 opposite from the flange 412 is free from any attachment, and accordingly when the vibratory device 392 is vibrating a node will develop in the support mount 410 at flange 416, which is one-quarter wavelength distant from the free end 414 of support mount 410. Flange 416 projects radially beyond the cylindrical shell 410 and is secured in the open front end of barrel 352 by a clamping ring 418 and cap screws 420.

In the illustrated embodiment the magnetostrictive transducer 394, the cylindrical coupling member 404 and the second coupler member 406 are each dimensioned to have a length equal to one-half wavelength, and are designed to be resonant at the applied operating frequency so as to deliver the maximum amount of power, and to have the joints, namely the joints between the magnetostrictive transducer 394 and the cylindrical coupling member 404, the joint between the cylindrical coupling member 404 and the second coupling member 406 and the resonant tip 398, positioned at a loop of wave motion whereby the joints of the vibratory device 392 will not be seriously stressed.

For continuous seam welding, the resonant tip 398 should preferably be a circular disc tip, as described in copending United States patent application Serial No. 747,254 filed July 8, 1958, in the names of William C. Elmore and Carmine F. De Prisco, entitled "Vibratory Device," the disclosure of which is incorporated herein by reference.

When the resonant tip 398 is a circular disc tip, the resonant tip 398 is acoustically driven at its center, and is dimensioned according to the theory disclosed in the previously cited application Serial No. 747,254 to vibrate at or close to the design frequency and preferably so as to provide a tip having a vibratory loop at its center and a vibratory loop at its periphery.

The polarizing coil 400 of the magnetostrictive transducer 394 is connected at one end to one end of the excitation coil 402 so that the polarizing coil 400 and excitation coil 402 are in series. The other end 422 of polarizing coil 400 extends through a hole 424 in barrel 352 and is connected to a circular metal slip ring 426 which is mounted on a sleeve 428 surrounding barrel 352 so as to rotate with the barrel 352. The other end 430 of excitation coil 402 extends through a hole 432 in barrel 352 and is connected to a second circular metal slip ring 434 mounted on sleeve 428. A pair of contact brushes 436 and 438 of electrical conducting material are slidably carried in electrically insulating sleeves 440 and 442 respectively and slidably engage the outer surfaces of slip rings 426 and 434 respectively. Helical coil springs 444 and 446 are compressed between the brushes 436 and 438 and caps 448 and 450 threaded on the upper end of insulating sleeves 440 and 442 to hold the brushes 436 and 438 against the slip rings 426 and 434. Rods 452 and 454 of electrically conducting material are connected to the upper surfaces of brushes 436 and 438 respectively and extend upwardly through springs 444 and 446 and caps 448 and 450 into a recess 456 in the top of welding head casing 334. Insulated wires 458 and 460 are connected to the upper ends of rods 452 and 454 respectively, and the wires 458 and 460 extend through an insulated grommet 462 in a cover plate 464 which extends across recess 456 and is secured to welding head casing 434 by cap screws 466.

Referring to Figure 10, the wire 460 is connected through line 468 and a capacitor 470 to the high side of the output transformer 472 of the R.-F. power supply. Wire 460 is also connected through line 474 and reactor 476 to the plus side of the D.-C. power supply, such as a battery 478. Wire 458 is connected by line 480 to the low side of transformer 472, and by line 482 to the minus side of battery 478. Lines 480 and 482 are both connected to ground. Capacitor 470 is provided to block the D.-C. current from battery 478 from going through the secondary of the transformer 472 but allows the R.-F. to flow. The reactor 476 is provided to prohibit the R.-F. energy from the transformer 472 from being short-circuited by the D.-C. polarizing current, but allows D.-C. flow.

Figure 7:
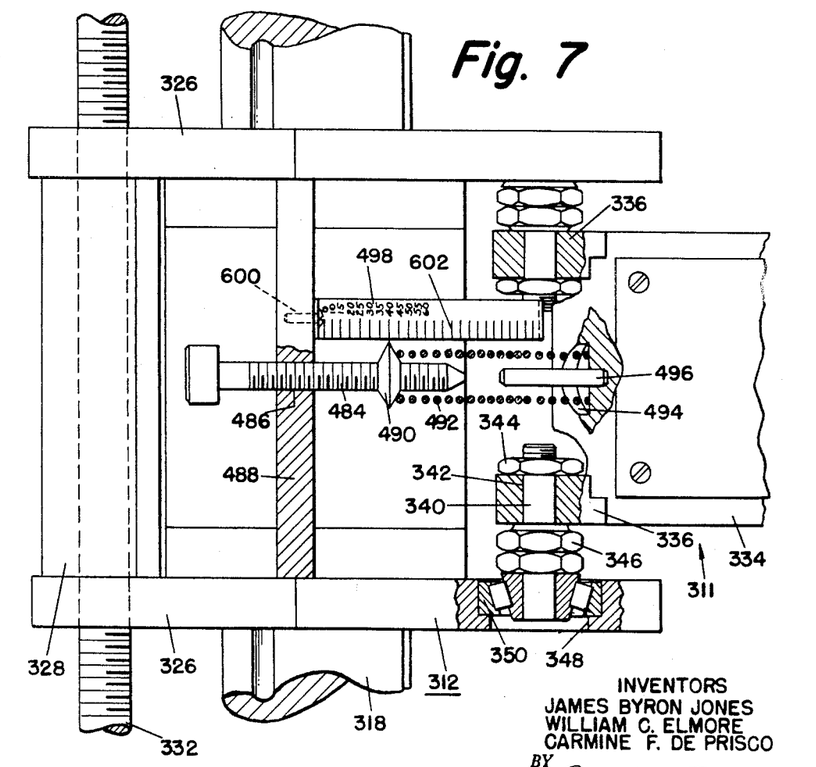
Figure 7 is a top elevation view, partially sectioned, of a portion of the welding apparatus of Figure 6.

Referring to Figures 7 and 8, a screw 484 is threaded through a hole 486 in a rod 488 connected between the mounting plates 326 of supporting mount 312 above the sleeve 316. Screw 484 is angled downwardly toward welding head casing 334, and a nut 490 is threaded on the end of the screw 484. The sides of nut 490 are tapered so that they come to an edge at the periphery of the nut 490. A helical coil spring 492 is compressed between nut 490 and the bottom of a shallow socket 494 in welding head casing 334. A pin 496 extends from the bottom of socket 494 through spring 492 to prevent the spring 492 from slipping out of the socket 494. An indicating plate 498 is secured to the front face of bar 488 by screws 600. Indicating plate 498 is adjacent and parallel to screw 484, and has indicia marks 602 on its upper surface which are calibrated to correspond with the pressure being applied by spring 492 on welding head casing 334. Thus, the pressure applied by spring 492 can be varied by rotating screw 484, and the pressure being indicated by the position of the periphery of nut 490 along indicating plate 498.

In Figure 6 there is shown the application of the vibratory welding device shown in Figures 7 and 8 of the present invention for splicing together the discontinuous ends of a web of metal foil.

The conditions under which welding may be effected with the vibratory device of the present invention are those conditions which have heretofore been developed in connection with vibratory welding, as cited above.

The operation of the splicing device is in general as follows:

With the welding head 314 being lifted up so that welding tip 398 is out of contact with anvil-tension roll 610, one of the discontinuous ends of the web of foil is brought under tension roll 612 and over and around anvil-tension roll 610. The one end is held to the anvil-tension roll 610 by suction which is drawn through holes 616 in the anvil-tension roll 610. The other discontinuous end of the web of foil is brought over anvil-tension roll 610 so that it overlaps the one end secured to the anvil-tension roll 610, and the other end is placed over and around tension roll 612. The other end of the web of foil is held to tension roll 612 by suction drawn through holes 618 in the tension roll 612. Welding head 314 is then moved downwardly to bring welding tip 398 into contact with the anvil-tension roll 610, and screw 484 is adjusted so that spring 492 holds welding tip 398 against the anvil-tension roll 610 with the necessary pressure for the welding operation. The vibratory power supply is then turned on and the drive to screw shaft 332 is turned on. Rotation of screw shaft 332 traverses the welder 311 along supporting shaft 318 and traverses the welding tip 398 along anvil-tension roll 610 and over the overlapped portions of the discontinuous ends of the metal foil. As the welder 311 traverses along shaft 318, the rack 388 rotates gear 386 and thereby rotates welding tip 398, so that the tip 398 rolls essentially without slippage along anvil-tension roll 610, thereby providing a seam weld.

The overlapped portions of the discontinuous ends of the web of foil are maintained in regulated alignment and firm contact due to the force exerted on them by the welding tip 398, such force being supplied by the spring 492. Welding is effected between the overlapped portions of the discontinuous ends of the web of foil under the conditions heretofore set forth by introducing continuous-wave elastic vibration from the tip 398 to the ends of the web of foil, said elastic vibration including a component parallel to the interface between the overlapped portions of the ends of the webs of foil, the tip 398 being vibrated in the direction of the double-headed arrow 620 (see Figure 8) on the uppermost surface of the end of the web contacted by the tip 398 while the aforesaid clamping force is being applied.

As illustrations, the various embodiments of the vibratory welding apparatus of the present invention have been used to seam-weld metals together as follows:

Example I

Using the type of welding apparatus shown in Figures 2 and 3, having a nominal operating frequency of 15,000 cycles per second, two thicknesses of 1100 aluminum of various thicknesses ranging from 0.006 to 0.020 inch were seam-welded together at a rate of from 2.5 to 15 feet per minute, with clamping forces of from 40 to 60 pounds, and power of from 125 to 1400 watts effective to the transducer.

Example II

Using the type of welding apparatus shown in Figures 2 and 3, having a nominal operating frequency of 15,000 cycles per second, layers of 1100–H18 aluminum of various thicknesses ranging from 0.006 to 0.020 inch were seam welded together at a rate of from 2.5 to 50 feet per minute, using clamping forces of from 35 to 75 pounds, and power of from 200 to 2350 watts.

Example III

Using the type of welding apparatus shown in Figures 2 and 3, having a nominal operating frequency of 28,000 cycles per second, 0.004- and 0.005-inch thicknesses of 1100 aluminum were seam-welded together at a rate of 2 feet per minute using clamping forces of from 30 to 50 pounds, and power of from 300 to 350 effective watts.

Example IV

Using the type of welding apparatus shown in Figures 2 and 3, having a nominal operating frequency of 28,000 cycles per second, 0.002-inch 1100 aluminum was seam welded at a rate of 2 feet per minute, using a clamping force of 10 pounds and power of 25 watts.

Example V

Using the type of welding apparatus shown in Figures 2 and 3, having a nominal operating frequency of 50,000 cycles per second, 1100–H18 aluminum foil having a thickness of 0.001-inch was seam welded at a rate of 15 feet per minute using a clamping force of from 10 to 15 pounds, and power of 50 effective watts.

Example VI

Using the same welding apparatus as in Example V, the same type and thickness of aluminum foil as used in Example V was seam welded at a rate of 35 feet per minute, using a clamping force of from 10 to 15 pounds, and power of 100 effective watts.

Example VII

Using the type of welding apparatus shown in Figures 2 and 3, having a nominal operating frequency of 15,000 cycles per second, seam welds were accomplished between 0.001-inch thicknesses of 1100–H18 aluminum at a rate of over 240 feet per minute, using clamping forces of from 52 to 65 pounds, and power of from 1600 to 2000 effective watts.

Example VIII

Using a prototype of the seam welding apparatus shown in Figures 4 and 5, operating at a nominal frequency of 15,000 cycles per second, 0.004- to 0.015-inch thicknesses of 70–30 brass were seam welded to 0.030-inch low carbon steel, at a rate of 2.6 to 7.5 inches per minute, using clamping forces of from 100 to 200 pounds, and power of 400 effective watts.

*Example IX*

Using the type of welding apparatus shown in Figures 4 and 5, operating at a nominal frequency of 15,000 cycles per second, 17–7 PH stainless steel of thicknesses of 0.005-inch and 0.008-inch was seam welded at a rate of 2.7 to 5.0 inches per minute, using a clamping force of between 100 and 300 pounds, and a power of from 400 to 800 effective watts. Specimens welded at 600 watts power, 200 pounds clamping force, and a speed of 5 inches per minute showed strengths averaging about 240 pounds, for a ½-inch specimen tested in tensile-shear.

*Example X*

Using a prototype of the welding apparatus shown in Figures 4 and 5, operating at a nominal frequency of 15,000 cycles per second, similar thicknesses of 0.010-, 0.020-, 0.032-, and 0.040-inch 1100–H14 aluminum were seam welded together at welding speeds of from 3.4 to 10 inches per minute, using a clamping force of from 50 to 200 pounds, and power of from 100 to 400 effective watts.

*Example XI*

Using the type of welding apparatus shown in Figures 4 and 5, seam welding of 2024–T3 Alclad aluminum alloy which had been degreased in a commercial detergent prior to welding, and of 2024–T3 bare aluminum alloy which was both degreased and deoxidized prior to welding, was accomplished between 0.025-inch and 0.032-inch thicknesses at welding speeds of from 2.7 to 6.5 inches per minute, using clamping forces of from 200 to 350 pounds and power of from 750 to 1450 effective watts.

*Example XII*

Using the type of welding apparatus shown in Figures 6, 7, and 8, operating at a nominal frequency of approximately 50,000 cycles per second, seam welds were made in aluminum foils of thicknesses of between 0.00017-inch and 0.001-inch at welding speeds of approximately 200 inches per minute, using a clamping force of between 1 and 20 pounds, and a power of from 15 to 100 effective watts.

The same welding apparatus operating at somewhat lower speeds, such as speeds in the range of 10 feet per minute down to about 1 foot per minute, and at the same power level, and at somewhat higher clamping forces, such as clamping forces in the range of up to about 40 pounds, can join foils having a thickness of up to approximately 0.006-inch.

In all of the above examples illustrating the manner of using the various embodiments of the seam welding apparatus of the present invention, welding was commenced at room temperature.

The higher rates of welding speed were generally accomplished with welding apparatus incorporating the resonant-disc-type tip described hereinabove.

In the foregoing, three basic types of vibratory seam welding equipment have been shown. The present invention may be embodied in other specific forms without departing from the spirit or essential attributes thereof and, accordingly, reference should be made to the appended claims rather than to the foregoing specification as indicating the scope of the invention.

We claim:

1. A method of seam welding metal members comprising contacting the to-be-welded faces of the metal members against each other, forcefully engaging an outer face of one of the metal members adjacent the weld zone with a part of the periphery of a circularly cross-sectioned end portion of a vibrating element, with said force being in a direction and of a magnitude sufficient to hold the contacting to-be-welded faces of the metal members in intimate contact at the intended weld zone and to couple mechanical vibratory energy into said weld zone, and rotatively engaging said circularly cross-sectioned end portion of said vibrating element with said outer face of said one of the metal members while introducing to the metal members through said end portion of said vibrating element mechanical vibratory energy having a frequency of between about 59 and 300,000 cycles per second while said force is being applied to produce a seam weld between the metal members, said vibratory energy comprising a vibration component in a direction substantially perpendicular to the direction of applied force, such component being of an energy level sufficient to seam weld the metal members to each other with the temperature in the weld zone (such temperature being that which can be determined with a thermocouple) during the introduction of the vibratory energy being below the melting temperature of any of the metal members.

2. A method of seam welding in accordance with claim 1 in which the longitudinal axis of the vibrating element is maintained approximately parallel to the plane of the juxtaposed to-be-welded faces of the metal members.

3. A method in accordance with claim 1 in which the rotating end portion of the vibrating element is rotated by the rotation of the vibrating element, while the vibratory energy is being introduced through the vibrating element so as to provide a seam weld between the metal members.

4. A method in accordance with claim 1 in which the metal members are movingly engaged relative to the rotating end portion of the vibrating element while the vibratory energy is being introduced through the vibrating element so as to provide a seam weld between the metal members.

5. A method in accordance with claim 1 in which the applied force is below the amount of force necessary to produce ten percent deformation in the metal members.

6. A method in accordance with claim 1 in which the mechanical vibratory energy has a frequency of between about 4000 and 90,000 cycles per second.

7. A method in accordance with claim 1 in which the end portion of the vibrating element is simultaneously rotatingly engaged in reference to the metal members and moved along the outer face of the one metal member.

8. A method in accordance with claim 1 in which the metal members are movingly engaged relative to the rotating end portion of the vibrating element by engagement with a moving support.

9. A method in accordance with claim 1 in which the longitudinal axis of the vibrating element is maintained at an angle of from about zero to sixty degrees in relation to the to-be-welded faces of the metal members.

10. A method in accordance with claim 1 in which the mechanical vibratory energy consists of substantially a single vibratory component.

11. A method in accordance with claim 1 in which the mechanical vibratory energy comprises a plurality of vibration components.

12. A method in accordance with claim 1 in which the welding is effected while the metal members are in an inert gaseous atmosphere.

13. A method in accordance with claim 1 in which at least one of the metal members which is welded comprises aluminum.

14. A method in accordance with claim 1 in which at least one of the metal members which is welded comprises copper.

15. A method in accordance with claim 1 in which at least one of the metal members which is welded comprises iron.

16. A method in accordance with claim 1 in which at least one of the metal members which is welded comprises titanium.

17. A method in accordance with claim 1 in which at least one of the metal members which is welded has a thickness of below about 0.100 inch.

18. A method in accordance with claim 1 in which a plurality of the metal members which are welded comprise metals having a thickness of below about 0.100 inch.

19. A method in accordance with claim 1 in which at least one of the metal members which is welded has a thickness of below about 0.005 inch.

20. A method in accordance with claim 1 in which a plurality of the metal members which are welded comprise metals having a thickness of below about 0.005 inch.

21. A method in accordance with claim 1 in which the welding is initiated while the metal members to be welded are at room temperature.

22. A method in accordance with claim 1 in which the metal members are advanced during engagement with the rotating end portion of the vibrating element by engagement with a rotating support.

23. A method of seam welding metal members comprising contacting the to-be-welded faces of the metal members against each other, forcefully engaging an outer face of one of the metal members adjacent the weld zone with a part of the periphery of a circularly cross-sectioned end portion of a vibrating element, with said force being in a direction and of a magnitude sufficient to hold the contacting to-be-welded faces of the metal members in intimate contact at the intended weld zone and to couple mechanical vibratory energy into said weld zone, and rotatively engaging said circularly cross-sectioned end portion of said vibrating element with said outer face of said one of the metal members while introducing to the metal members through said end portion of said vibrating element continuous wave mechanical vibratory energy having a frequency of between about 59 and 300,000 cycles per second while said force is being applied to produce a seam weld between the metal members, said vibratory energy comprising a vibration component in a direction substantially perpendicular to the direction of applied force, such component being of an energy level sufficient to seam weld the metal members to each other with the temperature in the weld zone (such temperature being that which can be determined with a thermocouple) during the introduction of the vibratory energy being below the melting temperature of any of the metal members.

24. A method in accordance with claim 23 in which the longitudinal axis of the vibrating element is maintained approximately parallel to the plane of the juxtaposed to-be-welded faces of the metal members.

25. A method in accordance with claim 23 in which the rotating end portion of the vibrating element is driven by the rotation of the vibrating element, while the vibratory energy is being introduced through the vibrating element so as to provide a seam weld between the metal members.

26. A method in accordance with claim 25 in which the end portion of the vibrating element is rotated in reference to the metal members and the metal members are moved relative to the rotating end portion of the vibrating element while the vibratory energy is being introduced through the vibrating element so as to provide a seam weld between the metal members.

27. A method of seam welding metal members comprising contacting the to-be-welded faces of the metal members against each other, forcefully engaging an outer face of one of the metal members adjacent the weld zone with a part of the periphery of a circularly cross-sectioned end portion of a vibrating element, with said force being in a direction and of a magnitude sufficient to hold the contacting to-be-welded faces of the metal members in intimate contact at the intended weld zone and to couple mechanical vibratory energy into said weld zone, and rotatably engaging said circularly cross-sectioned end portion of said vibrating element with said outer face of said one of the metal members while introducing to the metal members through said end portion of said vibrating element continuous wave mechanical vibratory energy having a frequency of between about 59 and 300,000 cycles per second while said force is being applied to produce a seam weld between the metal members, said vibratory energy comprising a vibration component in a direction which is approximately parallel to the interface between the contacting metal members, such component being of an energy level sufficient to seam weld the metal members to each other with the temperature in the weld zone (such temperature being that which can be determined with a thermocouple) during the introduction of the vibratory energy being below the melting temperature of any of the metal members.

28. A seam welding device for non-fusion welding contacting metal member together including a pair of spaced jaws between which a plurality of metal members to be seam welded are placed, at least one of said jaws having a circularly cross-sectioned end portion for engaging one of the contacting metal members with part of said end portion's periphery, means for impelling a jaw towards the opposite jaw with sufficient force to hold the to-be-welded faces of the metal members in intimate contact at the intended weld zone and to couple mechanical vibration into the intended weld zone when the to-be-welded metal members are interposed between the part of the periphery of said end portion of said one jaw and said other jaw, vibrating means for vibrating said circularly cross-sectioned end portion of said one jaw at a frequency of between about 59 and 300,000 cycles per second and so that at least a portion of the mechanical vibration introduced to the metal members by said one jaw is in a direction substantially perpendicular to the direction of applied force while the metal members are interposed between the part of the periphery of said end portion of said one jaw and said other jaw, the mechanical vibration delivered in a direction substantially perpendicular to the direction of applied force being at a sufficient energy level to weld the metal members together, and means for rotating said end portion of said one jaw while it is engaged with the metal members and while the vibratory energy is being introduced to the metal members so as to provide a seam weld between the metal members.

29. Apparatus in accordance with claim 28 in which the vibrating means for vibrating the rotating end portion of said one jaw vibrates said end portion with continuous wave vibration.

30. Apparatus in accordance with claim 28 in which the means for rotating the end portion of said one jaw comprises means for rotating said entire one jaw.

31. Apparatus in accordance with claim 28 in which the vibrating means vibrates the rotating end portion of said one jaw at a frequency of between about 4000 and 90,000 cycles per second.

32. Apparatus in accordance with claim 28 in which the longitudinal axis of said one jaw is maintained at an angle of from about zero to sixty degrees in relation to the interface between the to-be-welded metal members.

33. Apparatus in accordance with claim 28 which includes means on the other jaw for moving the to-be-welded metals relative to the one jaw so as to provide relative movement by engagement with the rotating end portion of the one jaw and the metal members to be welded while vibratory energy is being introduced through the rotating end portion of the one jaw so as to provide a seam weld between the metal members.

34. Apparatus in accordance with claim 28 in which the longitudinal axis of the one jaw is maintained approximately parallel to the contacting to-be-welded faces of the metal members.

35. Apparatus in accordance with claim 28 in which the one jaw is supported by a force-insensitive mount.

36. Apparatus in accordance with claim 35 in which the force-insensitive mount is a rotatable mount, and in which the apparatus includes means for rotating said mount so that the one jaw may be rotated relative to the metal members being welded.

37. Apparatus in accordance with claim 36 in which the other jaw includes a rotatable support of circular cross-section on which the metal members being welded are carried, and which includes means for rotating said rotatable support so that the peripheral velocity of the rotating support is the same as the peripheral velocity of the rotating end portion of the one jaw.

38. Apparatus in accordance with claim 35 in which the force-insensitive mount comprises a resonant member having a length equal to even multiples of one-quarter wavelength according to the properties of the material of which such mount is made at the frequency at which the vibrating means vibrates the rotating end portion of the one jaw, said mount having one end attached to the vibrating element, and with the other end of said mount being free from attachment to establish a node when the rotating end portion of the one jaw is being vibrated for anchoring said mount to anchorage means.

39. Apparatus in accordance with claim 28 in which the vibrating means comprises a magnetostrictive transducer.

40. Apparatus in accordance with claim 28 in which the vibrating means comprises a piezoelectric ceramic transducer.

41. A seam welding device for non-fusion welding contacting metal members together including a pair of spaced jaws between which a plurality of metal members to be seam welded are placed, at least one of said jaws having a circularly cross-sectioned end portion for engaging one of the contacting metal members with part of said end portion's periphery, means for impelling a jaw towards the opposite jaw with sufficient force to hold the to-be-welded faces of the metal members in intimate contact at the intended weld zone and to couple mechanical vibration into the intended weld zone when the to-be-welded metal members are interposed between the part of the periphery of said end portion of said one jaw and said other jaw, vibrating means for vibrating said circularly cross-sectioned end portion of said one jaw at a frequency of between about 59 and 300,000 cycles per second and so that at least a portion of the mechanical vibration introduced to the metal members by said one jaw is in a direction substantially parallel to the interface of the to-be-welded metal members while the metal members are interposed between the part of the periphery of said end portion of said one jaw and said other jaw, the mechanical vibration delivered in a path substantially parallel to the interface of the to-be-welded metal members being at a sufficient energy level to weld the metal members together, and means for rotating said end portion of said one jaw while it is engaged with the metal members and while the vibratory energy is being introduced to the metal members so as to provide a seam weld between the metal members.

42. Apparatus in accordance with claim 41 in which the vibrating means for vibrating the rotating end portion of the one jaw vibrates said rotating end portion with continuous wave vibration.

43. A seam welding device for non-fusion welding contacting metal members together including a pair of spaced jaws between which a plurality of metal members to be seam welded are placed, at least one of said jaws having a circularly cross-sectioned end portion for engaging one of the contacting metal members with part of said end portion's periphery, means for impelling a jaw towards the opposite jaw with sufficient force to hold the to-be-welded faces of the metal members in intimate contact at the intended weld zone and to couple mechanical vibration into the intended weld zone when the to-be-welded metal members are interposed between the part of the periphery of said end portion of said one jaw and said other jaw, vibrating means for vibrating said circularly cross-sectioned end portion of said one jaw at a frequency of between about 59 and 300,000 cycles per second and so that at least a portion of the mechanical vibration introduced to the metal members by said one jaw is in a plane tangent to said part of said end portion of said one jaw which contacts the to-be-welded metal members while the metal members are interposed between the part of the periphery of said end portion of said one jaw and said other jaw, the mechanical vibration delivered in a plane tangent to said part of said end portion of said one jaw which contacts the to-be-welded metal members while the metal members are interposed between the jaws being at a sufficient energy level to weld the metal members together, and means for rotating said end portion of said one jaw while it is engaged with the metal members and while the vibratory energy is being introduced to the metal members so as to provide a seam weld between the metal members.

44. Apparatus in accordance with claim 43 in which the vibrating means for vibrating the rotating end portion of the one jaw vibrates said rotating end portion with continuous wave vibration.

45. Apparatus in accordance with claim 44 in which the vibrating means vibrates the rotating end portion of said one jaw at a frequency of between about 4000 and 90,000 cycles per second.

46. A seam welding apparatus for non-fusion welding contacting metal members together comprising a support for supporting the metal members to be welded, a rotatable elongated jaw extending across said support and having an end for engagement with the outer face of one of the metal members to be welded, means for translating said support with respect to said jaw end so as to translate said metal members with respect to said jaw end, means for rotating said jaw whereby the peripheral speed of rotation of said jaw end is equal to the translation speed of the surface of said support which supports the metal members to be welded, means for urging said jaw end toward said support with a force sufficient to maintain said metal members in intimate contact at the intended weld zone and to couple mechanical vibratory energy to the intended weld zone when successive portions of the metal members and jaw are moving relative to each other, the longitudinal axis of said jaw being disposed approximately parallel to the to-be-welded faces of the metal members, said jaw end being circular in cross-section, means engaged with said jaw for vibrating said jaw end while the force is being applied at a frequency of between about 59 to 300,000 cycles per second and so that at least a portion of the mechanical vibration introduced to the metal members by said jaw end is in a direction substantially parallel to the interface of the to-be-welded metal members, the mechanical vibration delivered in a direction approximately parallel to the to-be-welded faces of the metal members being at a sufficient energy level to weld the metal members together when the temperature in the weld zone is below the melting temperature of any of the metal members (such temperature being that which can be determined with a thermocouple).

47. Apparatus in accordance with claim 46 in which the vibrating means vibrates the jaw end with continuous wave vibration.

48. A seam welding apparatus for non-fusion welding contacting metal members together comprising a mounting base, track means mounted on said base, a support for holding the metal members in facing contact, said support being translatably mounted on said track means, an elongated jaw mounted on said base and extending over said support, said elongated jaw having an end for engagement with the outer face of one of said metal members, said end being circular in cross-section, means for rotating said elongated jaw, means for translating said support along said track means so as to advance metal members with respect to said jaw end, means for urging said jaw end toward said support with a force sufficient to maintain the metal members being welded in intimate contact at the intended weld zone and to couple mechanical vibratory energy to the intended weld zone, said means for urging said jaw end toward said support applying said force when the metal members to be welded and the jaw end are moving relative to each other, means on said base engaged with said jaw remote from its end for vibrating said jaw at a frequency of between about 59 and 300,000 cycles per second and so that at least a portion of the mechanical vibration introduced to the metal members is in a direction substantially perpendicular to the direction of applied force when the force is being applied whereby said jaw end is vibrated in a direction perpendicular to the applied force, the mechanical vibration delivered in said direction perpendicular to the applied force being at a sufficient energy level to weld the metal members together at the intended weld zone, with the temperature in the weld zone during the vibration of said jaw being below the melting temperature of any of the metal members (such temperature being that which can be determined with a thermocouple).

49. Apparatus in accordance with claim 48 which includes a mechanism for moving the jaw relative to the track means, said mechanism including a means for rotating the jaw whereby the peripheral speed of the jaw end at the point of engagement with the metal members is substantially equal to the translating speed of the surface of the support which engages the metal members.

50. A seam welding device for non-fusion welding contacting metal members together including a jaw, said jaw having a circularly cross-sectioned end portion for engaging one of the contacting metal members with part of said end portion's periphery, means for impelling said jaw towards the to-be-welded metal members with sufficient force to hold the to-be-welded faces of the metal members in intimate contact at the intended weld zone and to couple mechanical vibration into the intended weld zone when the to-be-welded metal members are engaged by the part of the periphery of said end portion of said jaw, vibrating means for vibrating said circularly cross-sectioned end portion of said jaw at a frequency of between about 59 and 300,000 cycles per second and so that at least a portion of the mechanical vibration introduced to the metal members is in a direction substantially perpendicular to the direction of applied force while the metal members are engaged by the part of the periphery of said end portion of said one jaw, the mechanical vibration delivered in a direction substantially perpendicular to the direction of applied force being at a sufficient energy level to weld the metal members together, means for rotating said end portion of said jaw, and means for providing relative movement between said end portion of said jaw and successive portions of the metal members while said jaw is rotatingly engaged with the metal members and the vibratory energy is being introduced to the metal members so as to provide a seam weld between the metal members.

51. Apparatus in accordance with claim 50 in which the vibrating means for vibrating the rotating end portion of said jaw vibrates said rotating end portion of said jaw with continuous wave vibration.

52. A method of seam welding metal members comprising contacting the to-be-welded faces of the metal members against each other, forcefully engaging an outer face of one of the metal members adjacent the weld zone with a part of the periphery of a circularly cross-sectioned end portion of a vibrating element, with said force being in a direction and of a magnitude sufficient to hold the contacting to-be-welded faces of the metal members in intimate contact at the intended weld zone and to couple mechanical vibratory energy into said weld zone, and rotatively engaging said circularly cross-sectioned end portion of said vibrating element with said outer face of said one of the metal members while introducing to the metal members through said end portion of said vibrating element mechanical vibratory energy having a frequency of between about 59 and 300,000 cycles per second while said force is being applied to produce a seam weld between the metal members, said vibratory energy comprising a vibration component in the tangent plane of that part of said end portion of said vibrating element which engages said outer face of said one of the metal members, such component being of an energy level sufficient to seam weld the metal members to each other with the temperature in the weld zone (such temperature being that which can be determined with a thermocouple) during the introduction of the vibratory energy being below the melting temperature of any of the metal members.

53. A method in accordance with claim 52 in which the mechanical vibratory energy is continuous wave mechanical vibratory energy.

References Cited in the file of this patent
UNITED STATES PATENTS

| | | |
|---|---|---|
| 2,050,026 | Tarbox | Aug. 4, 1936 |
| 2,481,087 | Crise | Sept. 6, 1949 |
| 2,522,082 | Arnold | Sept. 12, 1950 |
| 2,632,858 | Calosi | Mar. 24, 1953 |
| 2,639,633 | Sowter | May 26, 1953 |
| 2,651,148 | Carwile | Sept. 8, 1953 |
| 2,680,333 | Calosi | June 8, 1954 |
| 2,707,821 | Sowter | May 10, 1955 |